H. E. FENNO.
TEMPLE MEMBER FOR GOGGLES.
APPLICATION FILED JAN. 27, 1916.
1,196,092.
Patented Aug. 29, 1916.
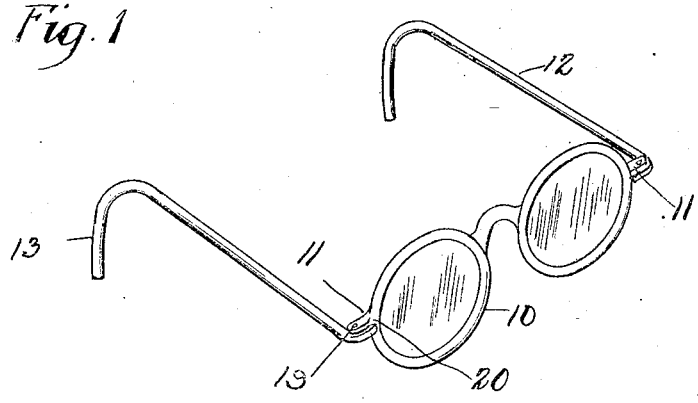
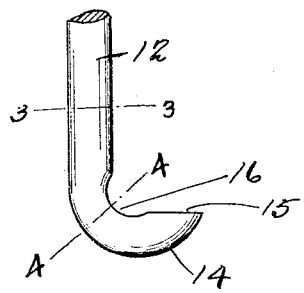
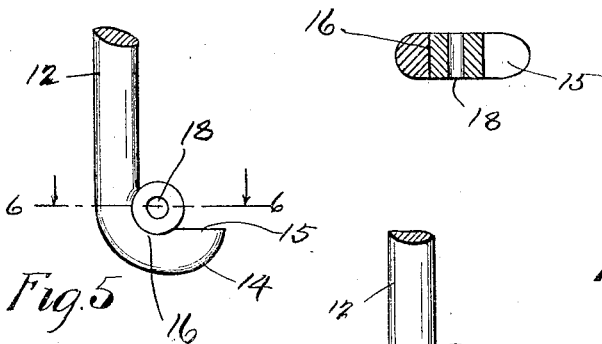
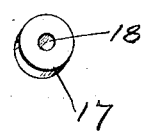
Witnesses
W. W. Bardsley
A. F. Macready
Inventor
Harry E. Fenno
By
Howard E. Barlow
Attorney

UNITED STATES PATENT OFFICE.

HARRY EDWARD FENNO, OF PROVIDENCE, RHODE ISLAND, ASSIGNOR TO GEORGE F. BERKANDER, OF PROVIDENCE, RHODE ISLAND.

TEMPLE MEMBER FOR GOGGLES.

1,196,092.   Specification of Letters Patent.   Patented Aug. 29, 1916.

Application filed January 27, 1916. Serial No. 74,705.

*To all whom it may concern:*

Be it known that I, HARRY E. FENNO, a citizen of the United States, and resident of the city of Providence, in the county of Providence and State of Rhode Island, have invented certain new and useful Improvements in Temple Members for Goggles, of which the following is a specification.

This invention relates to ear bows or temples for non-metallic frames or goggles, and the object of this invention is to materially reduce the cost of construction of the temple piece for such a spectacle by forming the same from a round finished rod of celluloid bent into shape, the pivot pad on the temple being formed of a separate member and cemented or otherwise secured thereto whereby the temple may be pivotally connected to the spectacle frame.

The usual temple is formed by first cutting the same from flat stock into the shape desired including the hook shaped portion at the pivot end for the stop, and including a lateral extension at the bend of the back to form the pivot pad. The body of the temple is then rounded to make the same smooth and shapely, all of which is quite an expensive operation. By my improved construction, I am enabled to form the temple complete from a length of finished celluloid rod. This is bent at one end to fit over the ear and at the other end to extend around in front of the frame to form a stop thereagainst. It is now only necessary to flatten the rod on its inner surface at the bend and secure a pivot disk of the same material to this flattened portion by cement or otherwise, and the whole is completed at a cost of construction which is much less than by the old method.

With these and other objects in view, the invention consists of certain novel features of construction, as will be more fully described, and particularly pointed out in the appended claim.

In the accompanying drawings: Figure 1— is a perspective view showing a pair of goggles with my improved temple attached thereto. Fig. 2— is an enlarged view of the pivoted end of the temple showing the same bent around at substantially a right angle to form a stop against the front of the frame and flattened on the inner curve of its bend to receive the pivot pad. Fig. 3— is a section on line 3—3 of Fig. 2 showing one form of the rod in cross section. Fig. 4— is a section on line 4—4 of Fig. 2 showing the pivot pad as secured in position to the temple. Fig. 5— is the same as Fig. 2 with the addition of the pivot pad which is shown as being connected to the temple. Fig. 6— is a section on line 6—6 of Fig. 5, looking in the direction of the arrow. Fig. 7— is a perspective view of the pivot pad. Fig. 8— is the same as Fig. 5 showing a portion of the frame to which the temple is pivotally attached.

Referring to the drawings 10 designates the lens frame which is preferably constructed of non-metallic material and is provided with the usual ears 11 between which the temple members are pivoted.

My improvement consists essentially in the construction of a temple member 12 whereby the same may be formed complete from a length of finished stock material in rod form. This rod is preferably formed round in cross section but may be of any other desired shape. In constructing the temple from such a rod I take a piece of the desired length, bend one end downward in a long hook form as illustrated at 13 in Fig. 1, to fit over and extend down back of the ear and its opposite end 14 is bent off laterally at substantially a right angle and flattened at its extremity at 15 to contact with the front face of the frame at 20 to form a stop thereagainst. When a temple is formed from a rod that is round in cross section as is usually the case I preferably cut away or flatten the temple as at 16 on its inner surface at the bend, and preferably on the arc of a circle thereby providing an extended flattened area to which a pivot disk 17 of the same or similar material may be securely cemented. It is found in practice that a cemented joint between two pieces of this material can be made as strong as the material itself providing a sufficient surface is presented for receiving the cement; therefore the broad surface I have provided for the disk permits the same to be attached to the rod so firmly that it is as strong as the rest of the temple. This pivot pad is provided with a pivot opening 18 through which the pin 19 is passed securing the temple to the frame. By this construction, it will be seen that the cost of forming a temple from a finished rod of stock material requiring only bending of the rod and the cementing of this small pad thereto greatly reduces its cost of construction over the old method of forming the temples from flat stock which after being cut to shape must be finished a second time, which is quite an expensive operation and where these goggles are manufactured in large quantities this reduction is quite an item in the cost of construction.

I have shown and described one form or method of attaching a pivot pad to a non-metallic temple member but the details of construction may be varied without departing from the spirit of my invention, the scope of the same being set forth in the following claim.

I claim:

In a spectacle, the combination with a lens frame, of a temple formed of a length of finished rod of non-metallic material of uniform size throughout its length and having one end bent substantially at a right angle to the axis of the rod, its extremity serving as a stop against the front of the frame, and a disk formed separate and having its periphery connected to said temple at the inner surface of the angle at the bend to form a pivot pad for attaching the temple to the frame, both the periphery of the disk and that of the temple being shaped to conform to each other's contour at the point of contact.

In testimony whereof I affix my signature in presence of two witnesses.

HARRY EDWARD FENNO.

Witnesses:
HOWARD E. BARLOW,
A. F. MACREADY.

Copies of this patent may be obtained for five cents each, by addressing the "Commissioner of Patents, Washington, D. C."